(12) United States Patent  
Park

(10) Patent No.: US 9,008,885 B2
(45) Date of Patent: Apr. 14, 2015

(54) VEHICLE CONTROL APPARATUS AND VEHICLE CONTROL METHOD

(71) Applicant: Mando Corporation, Pyeongtaek-si, Gyeonggi-do (KR)

(72) Inventor: Man Bok Park, Seoul (KR)

(73) Assignee: Mando Corporation, Pyeongtaek-Si (KR)

( * ) Notice: Subject to any disclaimer, the term of this patent is extended or adjusted under 35 U.S.C. 154(b) by 24 days.

(21) Appl. No.: 13/652,215

(22) Filed: Oct. 15, 2012

(65) Prior Publication Data

US 2013/0096766 A1    Apr. 18, 2013

(30) Foreign Application Priority Data

Oct. 14, 2011 (KR) .................. 10-2011-0105056

(51) Int. Cl.
*G01C 22/00* (2006.01)
*B60T 8/1755* (2006.01)
*B60W 30/02* (2012.01)
*B60W 30/18* (2012.01)
*B60W 10/188* (2012.01)

(52) U.S. Cl.
CPC .............. *B60T 8/1755* (2013.01); *B60W 30/02* (2013.01); *B60W 30/18145* (2013.01); *B60W 10/188* (2013.01); *B60W 2520/14* (2013.01); *B60W 2540/18* (2013.01); *B60W 2710/182* (2013.01)

(58) Field of Classification Search
CPC ..................................................... G05D 1/0088
USPC ............................................................ 701/23
See application file for complete search history.

(56) References Cited

U.S. PATENT DOCUMENTS

| | | | | |
|---|---|---|---|---|
| 2001/0020217 | A1* | 9/2001 | Matsuno ....................... | 701/301 |
| 2002/0109402 | A1* | 8/2002 | Nakamura .................... | 303/146 |
| 2009/0005933 | A1* | 1/2009 | Tabata et al. .................. | 701/42 |
| 2009/0143951 | A1* | 6/2009 | Takahashi et al. ............. | 701/70 |
| 2011/0282549 | A1* | 11/2011 | Choi .............................. | 701/41 |

FOREIGN PATENT DOCUMENTS

| | | |
|---|---|---|
| JP | 05-155323 A | 6/1993 |
| JP | 2007-101562 A | 4/2007 |
| JP | 2009-001275 A | 1/2009 |
| KR | 10-2003-0088070 A | 11/2003 |

OTHER PUBLICATIONS

Korean Office Action issued in Korean Application No. 10-2011-0105056 mailed Feb. 20, 2014.
Chinese Office Action issued in Chinese Application No. 201210387315.7 dated Dec. 15, 2014.

* cited by examiner

*Primary Examiner* — Behrang Badii
*Assistant Examiner* — Daniel L Greene
(74) *Attorney, Agent, or Firm* — McDermott Will & Emery LLP

(57) ABSTRACT

Disclosed herein are a vehicle control apparatus and a vehicle control method. The vehicle control apparatus includes a yaw-rate sensor to detect a yaw-rate of a vehicle, a steering-angle sensor to detect a steering angle of the vehicle, and a Micro Controller Unit (MCU) to calculate a yaw-rate based on the steering-angle, to calculate a target braking pressure of a wheel based on a difference between the actual yaw-rate detected via the yaw-rate sensor and the calculated yaw-rate, and to adjust a braking pressure of the wheel based on the calculated target braking pressure.

6 Claims, 3 Drawing Sheets

VEHICLE CONTROL APPARATUS AND VEHICLE CONTROL METHOD

CROSS-REFERENCE TO RELATED APPLICATION

This application claims the benefit of Korean Patent Application No. 2011-0105056, filed on Oct. 14, 2011 in the Korean Intellectual Property Office, the disclosure of which is incorporated herein by reference.

BACKGROUND

1. Field

Embodiments of the present invention relate to a vehicle control apparatus and a vehicle control method.

2. Description of the Related Art

An Anti-lock Brake System (ABS) of a vehicle serves to prevent locking of a wheel by appropriately adjusting a braking pressure applied to the wheel based on a slip rate that is calculated from a wheel speed. A Traction Control System (TCS) serves to control drive power of an engine in order to prevent sudden unwanted acceleration or excessive slip upon sudden acceleration of a vehicle.

The ABS and the TCS may provide good performance when a vehicle travels on a straight road. However, when the vehicle turns, understeer (plow-out: the vehicle does not turn enough) or oversteer (spin-out: the vehicle turns more sharply than intended) may occur.

For this reason, there is a demand for a vehicle stability system to stably control the attitude of a vehicle, i.e. to prevent loss of vehicle steering under any traveling situation. In one example, if understeer occurs when the vehicle turns less than the amount commanded by a driver and leaves a desired traveling track outward, it may be necessary to apply brake force to a rear inner wheel, so as to prevent the vehicle from turning along a path with a radius larger than intended. If oversteer occurs when the vehicle turns more than the amount commanded by the driver and leaves the desired traveling track inward, it may be necessary to apply brake force to a front outer wheel.

Performance of the system to control vehicle stability when the vehicle turns is determined whether the system may accurately predict a vehicle turn-speed that will be commanded by the driver and apply appropriate braking pressure to front and rear wheels to allow the vehicle to turn based on the predicted turn-speed.

Further, it may be necessary to control vehicle stability without deterioration in the performance of the above-described ABS and TCS and to prevent the ABS and TCS from having a negative effect on vehicle stability. Therefore, to appropriately control vehicle stability based on vehicle motion, cooperative control between the vehicle stability system and the ABS and TCS may be important.

SUMMARY

Therefore, it is an aspect of the present invention to provide a vehicle control apparatus and a vehicle control method, which maintain equal driving qualities between cruise control and braking control when a vehicle turns, thereby achieving improved driver ride comfort.

Additional aspects of the invention will be set forth in part in the description which follows and, in part, will be obvious from the description, or may be learned by practice of the invention.

In accordance with an aspect of the present invention, a vehicle control apparatus includes a yaw-rate sensor to detect a yaw-rate of a vehicle, a steering-angle sensor to detect a steering angle of the vehicle, and a Micro Controller Unit (MCU) to calculate a yaw-rate based on the steering-angle, to calculate a target braking pressure of a wheel based on a difference between the actual yaw-rate detected via the yaw-rate sensor and the calculated yaw-rate, and to adjust a braking pressure of the wheel based on the calculated target braking pressure.

In accordance with another aspect of the present invention, a vehicle control method includes detecting a yaw-rate of a vehicle, detecting a steering angle of the vehicle, calculating a yaw-rate based on the steering-angle, calculating a target braking pressure of a wheel based on a difference between the actual yaw-rate detected via a yaw-rate sensor and the calculated yaw-rate, and adjusting a braking pressure of the wheel based on the calculated target braking pressure.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
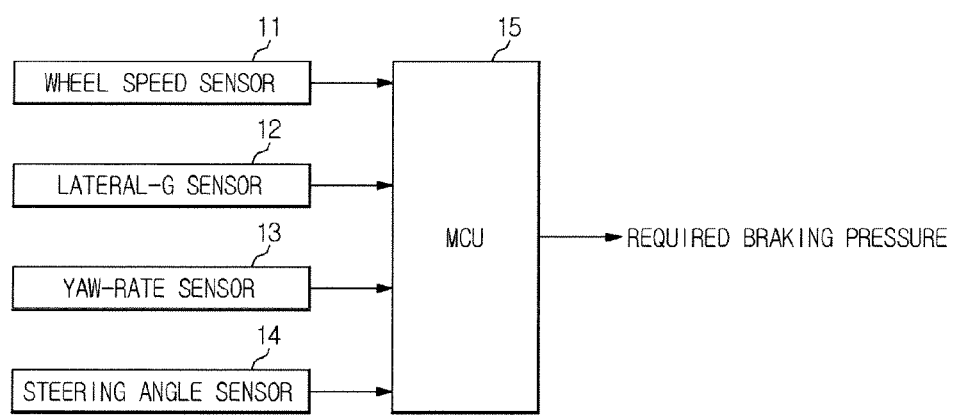
FIG. 1 is a view illustrating a vehicle control apparatus according to an embodiment of the present invention.

Reference will now be made in detail to the embodiments of the present invention, examples of which are illustrated in the accompanying drawings, wherein like reference numerals refer to like elements throughout.

FIG. 1 is a view illustrating a vehicle control apparatus according to an embodiment of the present invention. As illustrated in FIG. 1, a vehicle path prediction device 1 includes a wheel-speed sensor unit 11, a lateral-G sensor 12, a yaw-rate sensor 13, a steering-angle sensor 14, and a Micro Controller Unit (MCU) 15.

The wheel-speed sensor unit 11 includes an FL wheel-speed sensor which is installed to a left front wheel of a vehicle to detect the speed of the left front wheel, an FR wheel-speed sensor which is installed to a right front wheel to detect the speed of the right front wheel, an RL wheel-speed sensor which is installed to a left rear wheel to detect the speed of the left rear wheel, and an RR wheel-speed sensor which is installed to a right rear wheel to detect the speed of the right rear wheel. Each wheel-speed sensor of the wheel-speed sensor unit 11 transmits the detected wheel speed to the MCU 15.

The lateral-G sensor 12 is a 2-axis accelerometer that detects vehicle lateral acceleration (lateral-G) that is acceleration of force to cause the vehicle to be pushed laterally during traveling and transmits the detected lateral acceleration to the MCU 15.

The yaw-rate sensor 13 detects a turn rate of the vehicle and transmits the detected turn rate to the MCU 15. When the vehicle rotates about a vertical axis, i.e. about a Z-axis, the yaw-rate sensor 13 electronically detects yaw-moment of the vehicle via vibration change of an internal plate fork thereof. Here, the yaw-moment is inward or outward movement force caused when the vehicle turns leftward or rightward. The yaw-rate sensor 13 contains cesium crystals to generate voltage by rotation of the crystals when the vehicle rotates.

The steering-angle sensor 14 detects a steering angle of the vehicle and transmits the detected steering angle to the MCU 15. The steering-angle sensor 14 is mounted to a lower end of a steering wheel. The steering-angle sensor 14 detects a steering angle of the steering wheel operated by the driver when the vehicle turns and transmits the detected steering angle to the MCU 15. The steering-angle sensor 14 also detects a steering speed and steering direction of the steering wheel. The steering-angle sensor 14 may be of an optical device type in which a slit plate of the sensor is rotated during steering to transmit or intercept light of an optical device, causing voltage change. The MCU 15 calculates the steering speed, steering direction and steering angle of the steering wheel based on the voltage change transmitted from the steering angle sensor 14.

The MCU 15 calculates a target yaw-rate based on the steering angle as represented by the following Equation 1. For reference, a vehicle's actual yaw-rate is detected using the accelerometer (G-sensor).

$$\text{Yaw\_Rate}_{Original} = \frac{V}{l_f + l_r + \frac{mV^2(l_r C_{ar} - l_f C_{af})}{2 C_{af} C_{ar} L}} \delta \qquad \text{Equation 1}$$

here, "$l_f$" is distance from a front-wheel axle to the center of gravity,

"$l_r$" is distance from a rear-wheel axle to the center of gravity,

"$C_{af}$" is front-wheel cornering stiffness,

"$C_{ar}$" is rear-wheel cornering stiffness,

"L" is $l_f + l_r$,

"m" is vehicle mass

"δ" is steering angle, and

"V" is longitudinal wheel-speed.

The MCU 15 generates a target moment to compensate for a difference between the calculated target yaw-rate and an actual yaw-rate, and adjusts braking pressures of left and right wheels based on the target moment, thereby maintaining equal ride comfort between cruise control and braking control when the vehicle turns in a Smart Cruise Control (SCC) mode (i.e. an automated traveling control mode).

Figure 2:
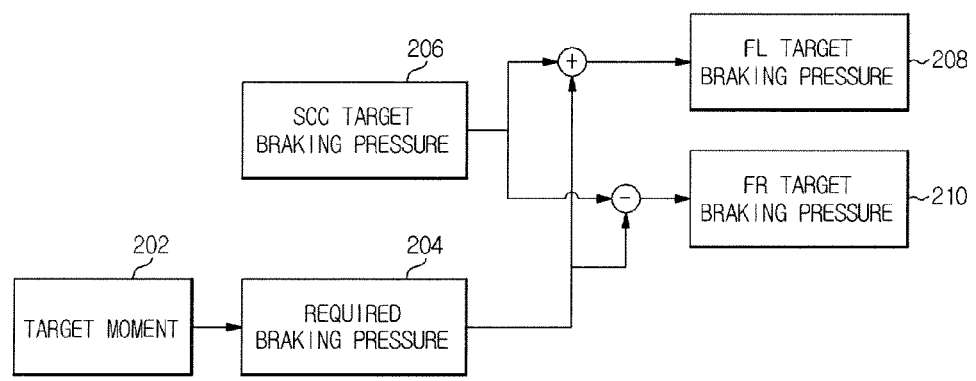
FIG. 2 is a conceptual view of braking pressure control.

FIG. 2 is a conceptual view of braking pressure control. As illustrated in FIG. 2, a target moment 202 to compensate for a difference between the target yaw-rate and the actual yaw-rate is generated, and then a required braking pressure 204 is calculated from the target moment 202. A target braking pressure 208 of the left wheel and a target braking pressure 210 of the right wheel are respectively calculated by adding or subtracting the required braking pressure 204 to or from an SCC target braking pressure 206. The calculated target braking pressures are used for actual braking control.

Figure 3:
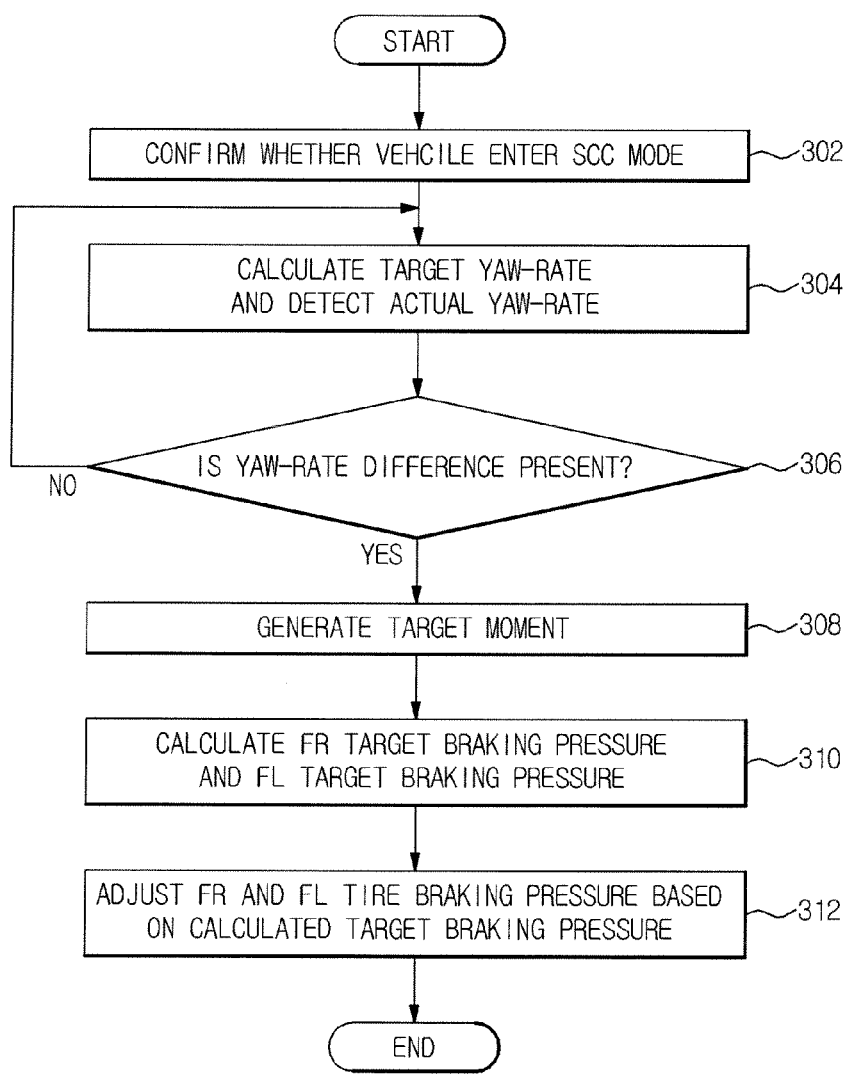
FIG. 3 is a flowchart illustrating an automated cruise control method of a vehicle according to an embodiment of the present invention.

FIG. 3 is a flowchart illustrating an automated cruise control method of a vehicle according to an embodiment of the present invention. As illustrated in FIG. 3, it is confirmed whether a vehicle enters an SCC mode (302). If the vehicle enters the SCC mode, the MCU 15 calculates a target yaw-rate (see the above Equation 1), and detects an actual yaw-rate (using the accelerometer) (304). Then, the MCU 15 confirms whether the target yaw-rate and the actual yaw-rate differ (306). If the target yaw-rate and the actual yaw-rate differ (yes in Operation 306), the MCU 15 generates a target moment based on a difference between the target yaw-rate and the actual yaw-rate (308). Then, the MCU 15 calculates a target braking pressure of a front rear wheel and a target braking pressure of a front left wheel based on the target moment (310). After the target braking pressures of the respective wheels are calculated, the MCU 15 adjusts braking pressures of the front left and right wheels based on the calculated target braking pressures, thereby maintaining equal ride comfort between cruise control and braking control when the vehicle turns in the SCC mode.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A vehicle control apparatus comprising:
   a yaw-rate sensor detecting a yaw-rate of a vehicle;
   a steering-angle sensor detecting a steering angle of the vehicle; and
   a controller calculating a yaw-rate based on the steering-angle, calculating a target braking pressure of a wheel based on a difference between the actual yaw-rate detected via the yaw-rate sensor and the calculated yaw-rate, and adjusting a braking pressure of the wheel based on the calculated target braking pressure,
   wherein the controller generates a target moment based on the difference between the actual yaw-rate and the calculated yaw-rate, and
   wherein the target braking pressure of the wheel is calculated based on the target moment.

2. The apparatus according to claim 1, wherein the controller performs wheel braking pressure control when the vehicle is in an automated traveling control mode.

3. The apparatus according to claim 1, wherein the controller calculates the yaw-rate based on the following Equation 1:

$$\text{Yaw\_Rate}_{Original} = \frac{V}{l_f + l_r + \frac{mV^2(l_r C_{ar} - l_f C_{af})}{2 C_{af} C_{ar} L}} \delta$$

here, "$l_f$" is distance from a front-wheel axle to the center of gravity,

"$l_r$" is distance from a rear-wheel axle to the center of gravity,

"$C_{af}$" is front-wheel cornering stiffness,

"$C_{ar}$" is rear-wheel cornering stiffness,

"L" is $l_f + l_r$,

"m" is vehicle mass

"δ" is steering angle, and

"V" is longitudinal wheel-speed.

4. A vehicle control method comprising:
   detecting, with a yaw-rate sensor, a yaw-rate of a vehicle;
   detecting, with a steering-angle sensor, a steering angle of the vehicle;
   calculating, with a controller, a yaw-rate based on the steering-angle;
   calculating, with the controller, a target braking pressure of a wheel based on a difference between the actual yaw-rate detected via a yaw-rate sensor and the calculated yaw-rate;
   adjusting, with the controller, a braking pressure of the wheel based on the calculated target braking pressure; and
   generating a target moment based on the difference between the actual yaw-rate and the calculated yaw-rate, wherein the target braking pressure of the wheel is calculated based on the target moment.

5. The method according to claim 4, wherein the controller a performs wheel braking pressure control when the vehicle is in an automated traveling control mode.

6. The method according to claim 4, wherein the controller calculates the yaw-rate based on the following Equation 1:

$$\text{Yaw\_Rate}_{Original} = \frac{V}{l_f + l_r + \frac{mV^2(l_r C_{ar} - l_f C_{af})}{2 C_{af} C_{ar} L}} \delta$$

here, "$l_f$" is distance from a front-wheel axle to the center of gravity,

"$l_r$" is distance from a rear-wheel axle to the center of gravity,

"$C_{af}$" is front-wheel cornering stiffness,

"$C_{ar}$" is rear-wheel cornering stiffness,

"L" is $l_f + l_r$,

"m" is vehicle mass

"$\delta$" is steering angle, and

"V" is longitudinal wheel-speed.

\* \* \* \* \*